Patented Aug. 6, 1940

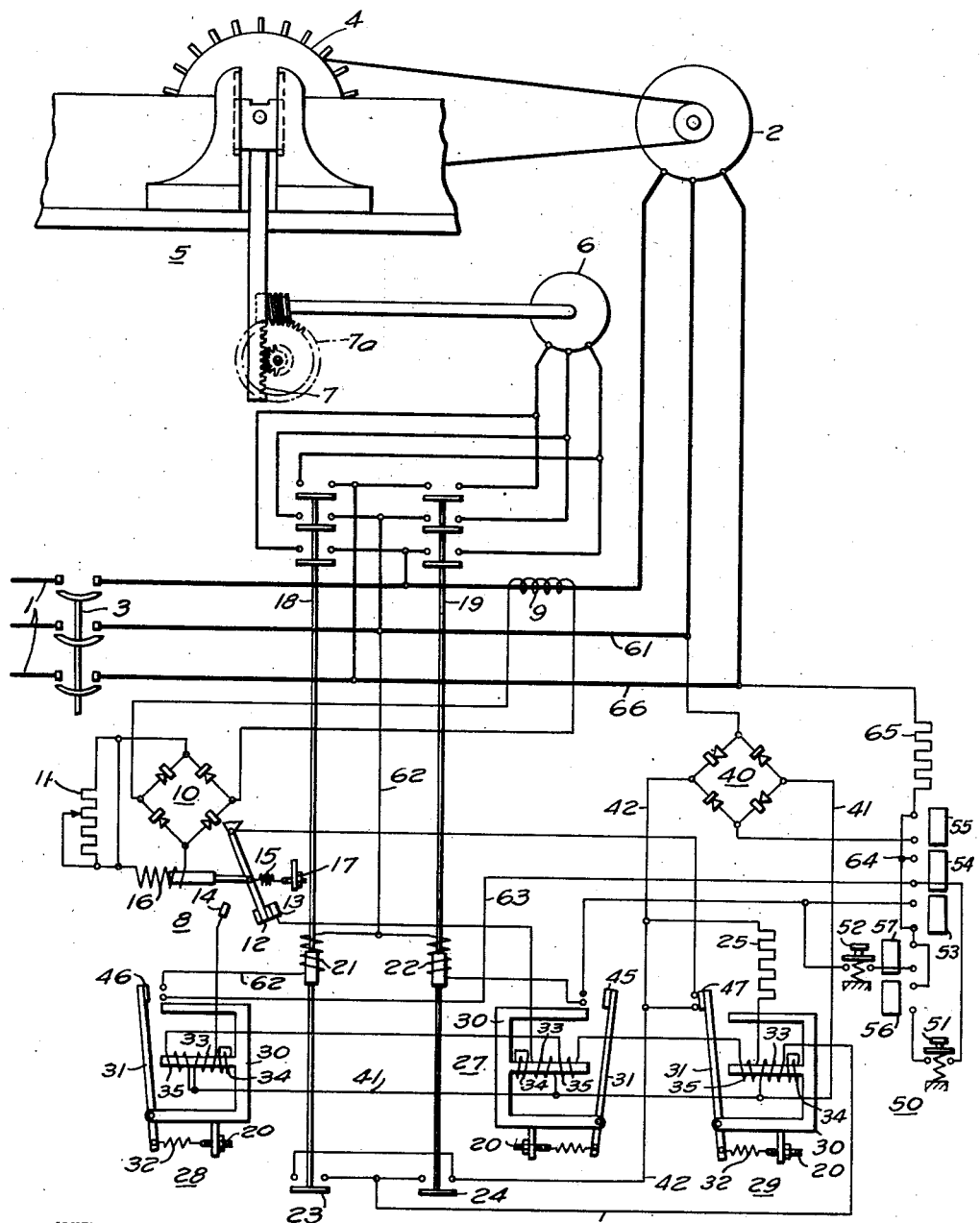

2,210,691

UNITED STATES PATENT OFFICE 2,210,691

REGULATOR SYSTEM FOR BEATERS AND SIMILAR LOADS

James G. Stephenson, Wilkinsburg, Pa., assignor to Westinghouse Electric & Manufacturing Company, East Pittsburgh, Pa., a corporation of Pennsylvania Application May 27, 1938, Serial No. 210,347

2 Claims. (Cl. 172—239)

The invention relates to load regulators, and particularly to a load regulating system that may be available for many general applications where the load on a motor is to be regulated to keep it within the normal power capacity of the motor.

One object of the invention is to provide a simple regulating scheme for controlling the load on a motor in such manner as to keep the load within the capacity of the motor.

Another object of the invention is to provide a load regulating system employing simple, rugged and economical relay devices for establishing the regulating action.

Another object of the invention is to provide a simple and rugged system that shall be relatively sensitive and that shall operate in a manner to obviate hunting.

By way of illustration of the manner in which the system functions, I illustrate and describe its application to a beater for paper pulp working. In that application, the nature of the material for a short time may be such as to impose an excessive load upon the motor which operates the beater roller. It is satisfactory to relieve the load upon the roller slightly by raising the roller, in order to reduce the load upon the motor. After a short time, when the load is reduced and within the normal capacity of the motor, the beater roller may be relowered to its normal operating position, and the motor will then assume more load within its capacity.

The system which I provide to operate in accordance with the principles of this invention is shown in the accompanying diagram.

As illustrated in the diagram, energy from a main alternating-current supply circuit 1 is supplied to a main motor 2 through a suitable circuit breaker 3. The motor 2 operates a beater roller 4 which is schematically illustrated in its relation to the pulp working system 5, the details of which are unnecessary for the description of this invention. In normal operation the roller 4 grinds, presses and pushes the pulp along and through a path in the equipment of the pulp system 5. If the pulp has not been sufficiently dissolved or mixed with the solution to permit it to be readily pushed along by the roller 4, an excessive load may be imposed upon the roller 4, and the motor 2 will consequently be excessively loaded beyond its capacity.

When such overloading occurs, it is satisfactory for the operation of this system to reduce the load upon the motor 2 by slightly raising the beater roller 4, so that the load imposed upon the motor will be reduced. When that has been accomplished, the roller 4 may then be gradually restored to its normal operating position if in so doing the load upon the motor 2 remains within the normal capacity of the motor.

The adjustment of the operating position of the beater roller 4 is controlled by an auxiliary or pilot motor 6, which operates through suitable mechanism illustrated here schematically as a rack and pinion 7 controlled by a worm and gear 7a, to control the position of the beater roller 4, as, for example, by raising or lowering the roller 4 together with its bearings, with respect to the pulp material upon which the beater is to work.

The load upon the main motor 2 is measured by a load relay 8, through a current transformer 9 and a rectifier bridge 10 which converts the alternating current from the transformer 9 to direct current for the load relay 8. The load relay 8 comprises, briefly stated, a spring-biased movably mounted contact 12, shown as a pivoted contact for illustration, and two stationary contacts 13 and 14 that are adapted to be engaged by the contact 12, according to whether the motor load is below or above predetermined values. A spring 15 provides the operating force toward the right for the contact 12 and the solenoid 16 provides the operating force toward the left for the contact 12.

When the main motor 2 is operating within its normal load range, the contact 12 of the overload relay 8 will be in its intermediate neutral range. When the load exceeds a predetermined value corresponding to an overload point of the motor capacity, contact 12 will engage contact 14. When the motor load diminishes to a value below the normal load capacity of the motor, the contact 12 will engage the contact 13. The contacts 13 and 14 may be adjusted according to the requirements of the system, or according to any predetermined desired schedule of operation or control. The relative effect of coil 16 and spring 15 may also be adjusted by rheostat 11 and spring adjusting means 17.

In order to control the operation of the beater roller 4 according to the load imposed upon the motor 2, the auxiliary or pilot motor 6 is arranged to be operated in one direction or the other, by energy from the main source 1, through either of two reversing switching devices 18 and 19 having their stationary contact members interconnected with the source and the motor 6 as shown. The switch 18 is provided with an operating solenoid 21, and the switch 19 is provided with a similar operating solenoid 22. Switch 18 is also provided with an auxiliary front contact 23, and the switch 19 is provided with a similar auxiliary contact 24.

In order to prevent hunting of the beater and the auxiliary control motor 6, I provide a simple control system employing relays of the rugged type, whereby the adjustments of the position of the beater roller 4 are made in progressive increments with a time interval between the successive adjustments, so that the condition of the motor and the load may be detected to determine whether the system has become stabilized, before any further adjustment is made.

In order to provide such progressive adjustment in the operation of the system, I employ three timing relay devices 27, 28 and 29 of the type described and claimed in United States Patent 1,753,983 of W. G. Cook, issued April 8, 1930 and assigned to the present assignee.

For the purpose of the present application, it is sufficient merely to describe briefly the details and the manner of operation of the timing relays 27, 28 and 29. As illustrated, each relay comprises a core 30 of E-shape with a movable armature 31 pivotally supported at the end of one leg of the core in such manner that when attracted to the core, the armature will engage the three legs of the core to establish a substantially closed magnetic circuit. The armature, when so attracted, will move against the restraining force of an adjustable biasing spring 32 disposed between a projecting arm of the pivoted armature and spring tension adjusting means 20 mounted on a stationary part of the core frame. The middle leg of the core supports three windings, one a main operating winding 33, the second, a short circuited winding 34, and the third, a neutralizing winding 35 to buck out or neutralize the residual magnetic flux that would otherwise normally remain in the magnetic circuit including the core and the armature, when the main winding 33 is deenergized. The neutralizing winding 35 is normally continuously energized, but only to a relatively small degree, such as may be necessary merely to neutralize the small amount of residual magnetism that would be established and left in the relay magnetic circuit after the main winding is deenergized. The neutralizing winding 35 has very little effect in slowing up the operation of the relay when the main operating winding 33 is energized.

Thus when the relay is to be operated, the main winding 33 is energized and it immediately attracts the armature to the energized position of the relay. When the circuit of the energizing winding 33 is opened, the decay of the magnetic flux is slowed down by winding 34 until the normal residual flux value is attained. In the absence of the neutralizing winding 35, such residual flux would be sufficient to maintain the armature 31 at its attracted position against the restoring force of the reset biasing spring 32. However, inasmuch as the neutralizing winding 35 is continuously energized, it begins to neutralize the residual flux as soon as the main winding 33 is deenergized. The time required for the complete decay of the flux, to a value which may then be overcome by the restoring spring 32, constitutes the time element of the relay.

Energy for the timing relays 27, 28 and 29 is derived from the main circuit 1 through a second rectifier 40, which supplies direct-current energy to two direct-current conductors 41 and 42.

The neutralizing windings 35 of the three timing relays 27, 28 and 29 are connected in series with a current limiting resistor 25 and in series with each other to the two conductors 41 and 42 so that they are permanently energized. The operating winding 33 of relay 27 is connected to contact 13 of load relay 8. The operating winding 33 of timing relay 28 is connected to the overload contact 14 of load relay 8. The operating winding 33 of the timing relay 29 is connected to the auxiliary contacts 23 and 24 of the reversing switches for the auxiliary pilot motor 6. The auxiliary contacts 23 and 24 are connected in parallel as the operation of either of the switches for the auxiliary motor 6 will energize the operating coil of the timing relay 29.

Each of the timing relays 27, 28 and 29 is provided with a switch contact. The relay 27 is provided with a front contact 45, relay 28 is provided with a front contact 46, and the relay 29 is provided with a back contact 47. In order to provide for selective automatic operation or for hand-control operation, the circuits to the switching devices 18 and 19 for the pilot motor 6, are controlled through a main transfer switch or controller 50 which sets up the circuits for automatic operation or hand-control operation, as may be desired. In the case hand-control operation is desired, two push buttons 51 and 52 are also provided. The transfer switch 50 may be of any suitable type, and is illustrated as a drum controller switch, manually operable to either a right hand position, or a left hand position.

The controller 50 is provided with three switch segments 53, 54 and 55 for automatic operation, and with two segments 56 and 57 for manual control. The operation of the system as a whole may now be considered.

When the main circuit breaker 3 is closed, energy is supplied to the main motor 2 and also is made available for the auxiliary pilot motor 6 that controls the position of the load member or beater 4. As soon as the main motor 2 is energized, and operating at a desired load, the load relay 8 is energized, and the contact 12 will assume an intermediate position between the underload contact 13 and the overload contact 14 depending upon the degree of energization of the motor in accordance with the load on the beater 4. It will be assumed that the system is set for automatic operation with the controller 50 in the position where segments 53, 54 and 55 engage the contact fingers of the controller.

Upon the occurrence of an overload condition in the beater system, contact 12 will engage the overload contact 14. The operating coil of relay 28 will thereupon be energized through a circuit that may be traced from the direct-current conductor 41, the operating coil 33, of the relay 28, the contacts 14 and 12 of the load relay 8, and the back contact 47 of relay 29 to the other direct-current conductor 42. Relay 28 is thereupon operated to close its contact switch 46 which completes the energizing circuit to the coil 21 of switching device 18 for the auxiliary motor 6.

The energizing circuit for the coil of switch 18 may be traced from one main phase conductor 61 through a conductor 62, the operating coil 21 of the switch 18, the contact switch 46 of relay 28, and thence through a conductor 63 to the segment 54 of the controller 50, conductor 64 and resistor 65 to the other main phase conductor 66. The switch 18 is thereupon energized to close its contacts and to connect the motor 6 to the main supply source 1, thereupon energizing the motor 6 to operate the rack and pinion unit 7 to raise the beater roller 4, and, thereby to diminish the load on the beater.

Let us assume for the moment that the decrease in the load on the beater 4 is not sufficient to reduce the overload to a point where the motor 2 will be operating within its normal capacity range. It is, therefore, necessary to reduce the load upon the beater 4 still further.

When switch 18 closed upon energization of the winding 21, it closed its auxiliary contact 23. That contact upon closing completes a circuit from direct-current conductor 42 through the switch 23, a conductor 72, the operating coil 33 of the timing relay 29 to the direct-current conductor 41. Timing relay 29 is thereupon operated to open its switch 47 which removes potential from the coil 33 of the relay 28. The relay 28, upon being deenergized, operates to open its contact switch 46 after a short selected time interval, and the switch 46 in turn opens the circuit of the operating coil 21 of the switch 18 for the auxiliary motor 6. The switch 18 opens and disconnects the motor 6 so that the beater 4 will remain in the position to which the first adjustment has moved it.

When the switch 18 opens, it opens its auxiliary contact switch 23, and thereby opens the circuit of the operating coil 33 of the timing relay 29. The timing relay 29 after being deenergized, moves to its initial position after a predetermined interval of time, and recloses its auxiliary back contact switch 47.

If the load relay 8 is still energized to indicate an overload condition, and the contact 12 still engages the contact 14, the relay 28 will be again energized to close its switch 46 to reenergize the switch 18 through the auxiliary motor 6. This repeated operation will continue until the load upon the motor 2 is reduced to a value that is within the normal capacity of the motor as measured by the load relay 8.

The loaded member is thus progressively adjusted in small increments or steps to control the load upon the main motor until such load is within the normal operating capacity of the main motor.

If, now, the load upon the motor drops to or below some predetermined value, for which the system is set, the contact 12 of the load relay 8 will engage the underload contact 13.

When such underload condition is indicated by engagement of contacts 12 and 13 in the load relay 8, the circuit to the operating coil of the relay 27 will be completed. That circuit may be traced from conductor 42 through contact switch 47 of relay 29, contacts 12 and 13 of load relay 8, operating coil 33 of relay 27 to conductor 41.

Relay 27 will thereupon operate to close its auxiliary switch 45, and the latter switch will complete a circuit to the operating coil 22 of auxiliary switch 19 that controls the auxiliary motor 6. Switch 19 is arranged to connect the motor 6 to the main circuit 1 with one phase reversed from the connections provided through switch 18, so that the motor 6 will be rotated in a reverse direction, to lower the beater roller 4 to assume more load. Switch 19, upon closing, closes its auxiliary contact 24 which energizes the timing relay 29.

As explained previously, the operation of relay 29 opens the switch 47 which removes potential from the coil of the relay 27. After a short time interval, relay 27 opens its auxiliary contact switch 45 and deenergizes the operating coil 22 of switch 19. Switch 19 opens to deenergize motor 6, and, at the same time, opens its auxiliary contact switch 24 which deenergizes the timing relay 29.

The timing relay 29, upon being deenergized, resumes its initial position after a predetermined time interval, and at that time recloses its switch contacts 47.

If the increased load assumed by the beater roller 4 is now within the normal operating capacity of the motor 2, the load relay 8 will so indicate it by disengaging the contact 12 from the underload contact 13.

If the increase in load upon the beater roller 4 was not sufficient to raise the load upon the motor to the desired operating range, load relay 8 will reenergize the relay 27 and cause the beater roller 4 to be shifted to increase the burden upon it, so that the motor 2 may be increasingly loaded, and that operation will continue until the motor load is satisfactory as measured by the load relay 8.

By increasing or by decreasing the load upon the motor in short progressive increments, the motor may be gradually regulated to a desired normal neutral position, and any hunting tendency is thereby obviated.

By means of the transfer switch 50, the system may be arranged to be controlled automatically or may be arranged to be hand controlled.

My invention is not limited to the specific application of the regulating system which I disclose herein, since it may be variously applied to other applications where it is desired to maintain the load upon a motor within an optimum operating range, where the adjustment of the load upon the operating loaded member may be varied without interfering with the operation of the system.

The invention is not limited to the use of relays of the specific types illustrated, since these may be modified and other equivalent relays substituted for them without departing from the spirit and scope of the invention as set forth in the appended claims.

I claim as my invention:

1. In a system of control for an electric motor, in combination, a main motor driving a load tending to demand a variable torque of the motor; an auxiliary motor; a source of electric energy; electromagnetic switching means, having an operating coil, having main contact members for connecting the auxiliary motor to said source to operate in a forward direction to cause a decrease of the torque on the main motor, and having auxiliary contacts; a first time limit relay, having normally open contacts disposed to make and break the circuit of the operating coil of the said switching means, and having an operating coil which, when energized, operates the relay contacts to make the circuit for the operating coil of the said switching means and which, when deenergized, releases the relay contacts to break the circuit for the operating coil of the said switching means; a second time limit relay, having normally closed contacts disposed to break and make the circuit of the operating coil of the first time limit relay, and having an operating coil in the circuit of the auxiliary contacts of the said electromagnetic switching means and which operating coil, when energized, operates the relay contacts to break the circuit for the operating coil of the first time limit relay, and which operating coil, when deenergized, releases its relay contacts to make the circuit for the operating coil of said first time limit relay; control means responsive to a predetermined increase in load current of the main motor, due to rise in torque on the main motor, for energizing the operating coil of the first time limit relay, whereby said electromagnetic means, by reason of the recited coaction of the elements herein recited, is caused to operate intermittently and for predetermined time intervals as long as said control means is in operation.

2. In a system of control for an electric motor, in combination, a main motor driving a load tending to demand a variable torque of the motor; an auxiliary motor; a source of electric energy; electromagnetic switching means, having an operating coil, having main contact members for connecting the auxiliary motor to said source to operate in a reverse direction to cause an increase of the torque on the main motor, and having auxiliary contacts; a first time limit relay, having normally open contacts disposed to make and break the circuit of the operating coil of the said switching means, and having an operating coil which, when energized, operates the relay contacts to make the circuit for the operating coil of the said switching means and which, when deenergized, releases the relay contacts to break the circuit for the operating coil of the said switching means; a second time limit relay, having normally closed contacts disposed to break and make the circuit of the operating coil of the first time limit relay, and having an operating coil in the circuit of the auxiliary contacts of the said electromagnetic switching means and which operating coil, when energized, operates the relay contacts to break the circuit for the operating coil of the first time limit relay, and which operating coil, when deenergized, releases its relay contacts to make the circuit for the operating coil of said first time limit relay; control means responsive to a predetermined decrease in load current of the main motor, due to fall in torque on the main motor, for energizing the operating coil of the first time limit relay, whereby said electromagnetic means, by reason of the recited coaction of the elements herein recited, is caused to operate intermittently and for predetermined time intervals as long as said control means is in operation.

JAMES G. STEPHENSON.